United States Patent [19]

Takagi

[11] Patent Number: 4,769,681

[45] Date of Patent: Sep. 6, 1988

[54] PHOTOGRAPHIC PRINTER

[75] Inventor: Kunio Takagi, Tokyo, Japan

[73] Assignee: Fuji Photo Film Co., Ltd., Kanagawa, Japan

[21] Appl. No.: 22,527

[22] Filed: Mar. 9, 1987

[30] Foreign Application Priority Data

Mar. 7, 1986 [JP] Japan .................................. 61-50189
Mar. 7, 1986 [JP] Japan .................................. 61-50190

[51] Int. Cl.$^4$ ............................................. G03B 27/58
[52] U.S. Cl. .................... 355/72; 352/78 R; 353/26 R; 354/275
[58] Field of Search ............... 355/75, 72, 73; 242/76; 353/26 R, DIG. 2; 352/72, 78 R; 354/275

[56] References Cited

U.S. PATENT DOCUMENTS

| | | | |
|---|---|---|---|
| 3,823,891 | 7/1974 | Schrader | 354/275 X |
| 3,846,813 | 11/1974 | Oshima | 354/275 X |
| 4,166,588 | 9/1979 | Krehbiel et al. | 355/72 X |
| 4,627,719 | 12/1986 | Nitsch et al. | 355/41 |

Primary Examiner—Richard A. Wintercorn
Attorney, Agent, or Firm—Young & Thompson

[57] ABSTRACT

A photographic printer is provided with a printing table, a film carrier disposed on the printing table, and a film container removably disposed adjacent the film carrier on the printing table so as to collect a film intermittently emerging from the film carrier after exposure. The film container is provided with a film guide member therein for causing the film to be coiled.

6 Claims, 5 Drawing Sheets

4,769,681

PHOTOGRAPHIC PRINTER

BACKGROUND OF THE INVENTION

The present invention relates to a photographic printer which has a film container for an original transparency or negative film strip disposed in association with a film carrier.

In recent years, mini-laboratory type printing apparatus has been widely used for producing photo prints on a small scale. The mini-laboratory type printing apparatus generally comprises a printer, a pare processor and a cutter, in which a complete printing operation can be carried out from printing to cutting. Specifically, each frame of an original transparency or negative film strip held in a negative carrier is projected onto a photographic paper to form its latent image thereon. The photographic paper thus provided with a series of latent images is advanced into the paper processor to be developed in a conventional way, and then cut frame by frame to provide completed photo prints.

In such mini-laboratory type printing apparatus, usually a full length of negative film strip is placed on a film carrier and advanced one frame each print by the operator. Part of the negative film strip after printing emerges from the film carrier and slides along a printing table on which the film carrier is supported, and hangs down from the printing table. The hanging part of the film is apt to be scratched on its surface and is unsightly. If a turntable is used to run the film carrier supported thereon through a right angle in order to vary the masking size of the film carrier according to the frame size of the negative, e.g., full size or half size, there is another problem in that part of the negative film strip, when printing, say, half size, will move toward and be deflected by the housing of the printer, thus getting tangled.

OBJECTS OF THE INVENTION

It is therefore an object of the present invention to provide a photographic printer which can prevent part of a negative film strip emerging from a film carrier from becoming scratched.

It is another object of the present invention to provide a photographic printer which can prevent part of a negative film strip emerging from a film carrier both from hanging down and from getting tangled.

SUMMARY OF THE INVENTION

To achieve the above objects of the present invention, the photographic printer is provided with a negative film strip container disposed adjacent a film carrier on a printing table; and part of the film emerging from the film carrier is introduced into and is coiled in the film container.

According to a feature of the present invention, the film container, which is removably attached to the printing table on which the film carrier is mounted, is provided with a film entrance at the lower end thereof and a collar-like guide member which serves to coil the negative film therein.

BRIEF DESCRIPTION OF THE DRAWINGS

The above and other objects and features of the present invention will be more apparent from the following description taken in conjunction with preferred embodiments shown in the accompanying drawings, in which.

DETAILED DESCRIPTION OF THE INVENTION

Figure 1:
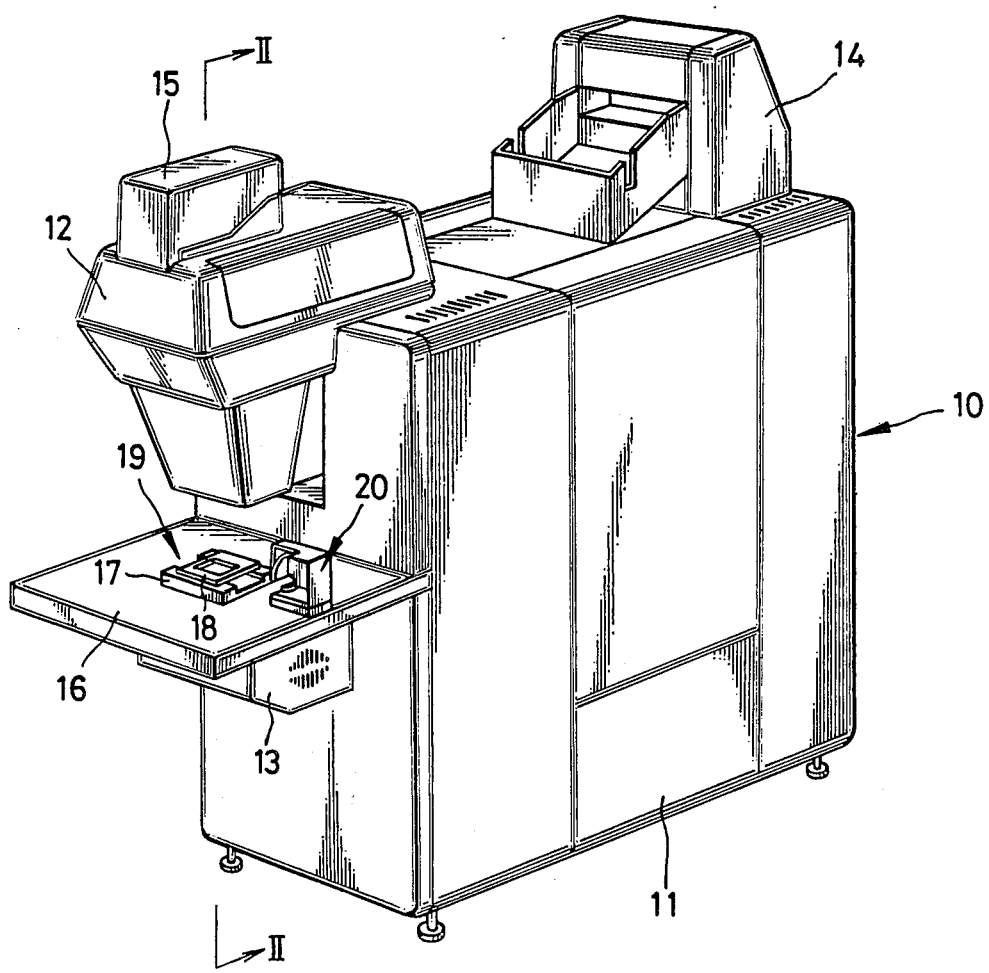
FIG. 1 is a perspective view of a printer processor embodying the present invention.

Preferred embodiments of the present invention will now be described with reference to the accompanying drawings. In the figures, elements designated by the same reference numerals are identical or similar elements.

Referring now to FIG. 1, shown therein is a bottom-illuminated type of mini-laboratory processor 10 having a processor unit housing 11, an exposure unit housing 12 attached to the upper front of the processor unit housing 11, a lamp housing 13 attached to the lower front of the processor unit housing 11, and a cutter unit housing 14 attached to the upper rear of the processor housing 11. In the exposure unit housing 12, there is an exposure system for exposing a photographic paper withdrawn from a paper magazine 15 which is adapted to be detachably mounted thereon. As is well known in the art, the photographic paper withdrawn from the magazine 15 is, after having been exposed in the exposure unit housing 12, advanced into the processor unit housing 11 wherein there are a developing tank, a bleaching-fixing tank, and a washing tank arranged in this order for processing an exposed photographic paper. After having been processed, the photographic paper is cut with a cutter in the cutter unit housing 14 into completed individual prints.

A printing table 16 under which the lamp housing 13 is attached has on its upper surface a film carrier 19 comprising lower and upper masking members 17 and 18. On the right hand side in FIG. 1, toward which a negative film strip emerges from the film carrier 19, there is a film container 20 in which the negative film strip from the film carrier 19 is collected.

Figure 2:
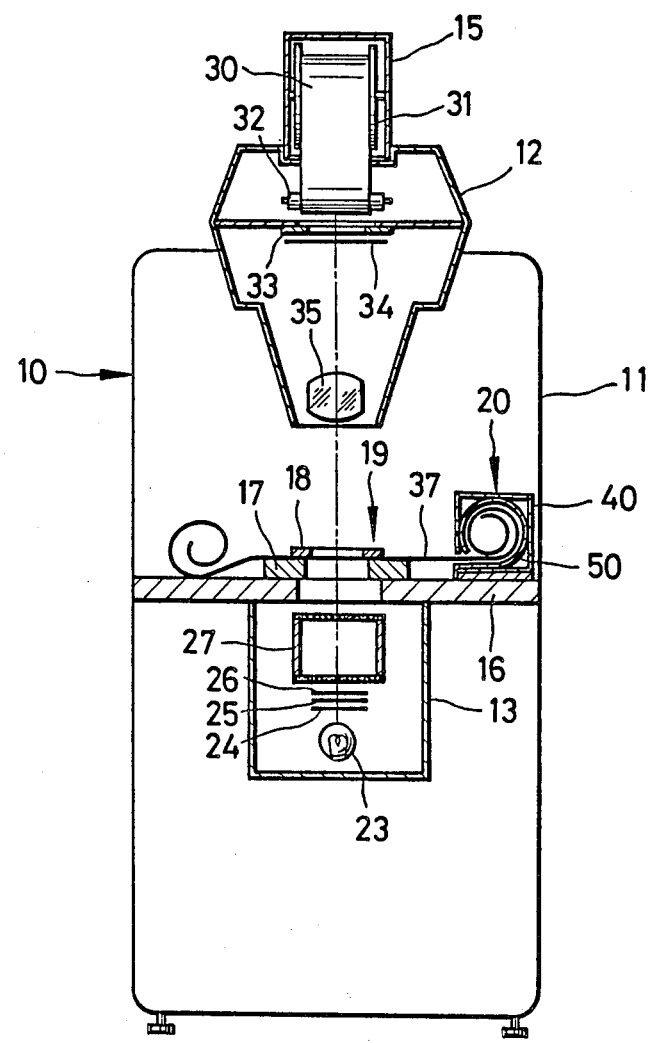
FIG. 2 is a sectional view taken along line II—II in FIG. 1.

As is shown in FIG. 2 in more detail, inside the lamp housing 13, there are a lamp 23 for emitting white light, three color filters for regulating blue, green and red components of white light, namely, cyan, magenta and yellow filters 24 to 26, a mirror box 27 of a rectangular cross section for diffusing white light which has inner mirror-walls and diffusion plates attached to both the open ends thereof.

In the magazine 15, there is a supply roll 31 around which a web-like photographic paper 30 is wound. When printing, the photographic paper 30 is intermittently withdrawn by means of a roller 32 and introduced into the exposure unit housing 12 and advanced to an exposure position defined by an exposure mask 33. Below the exposure mask 33, there are a printing lens 35 and a shutter 34 which is controlled to open and close so as to effect a proper exposure of the photographic paper 30.

Figure 3:
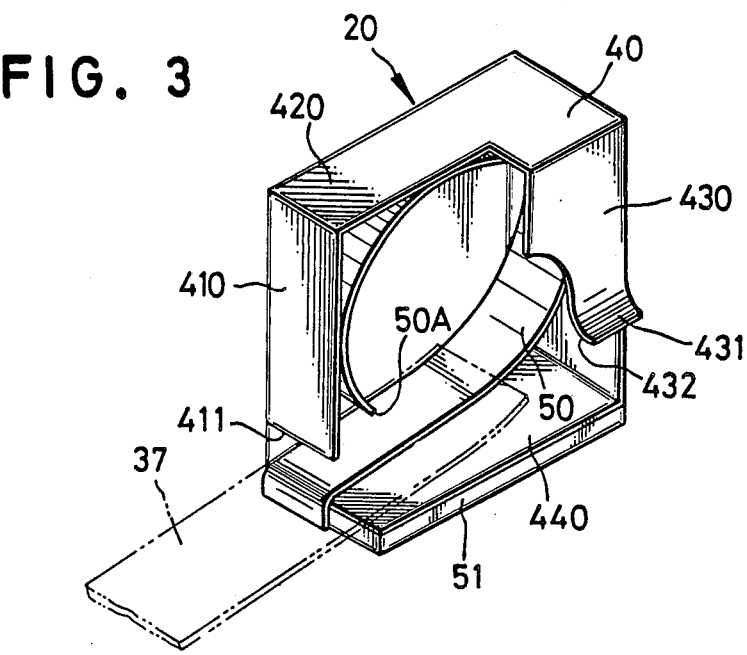
FIG. 3 is a perspective view of a film container of FIG. 1.
Figure 4:
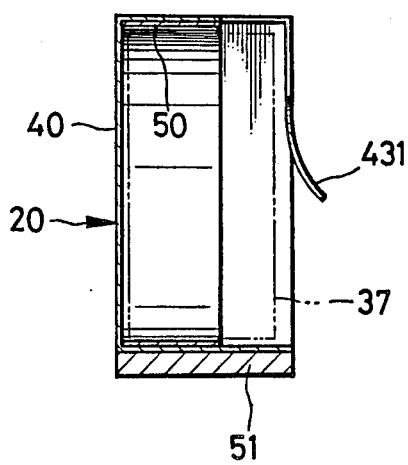
FIG. 4 is a sectional view of the film container of FIG. 3.
Figure 5:
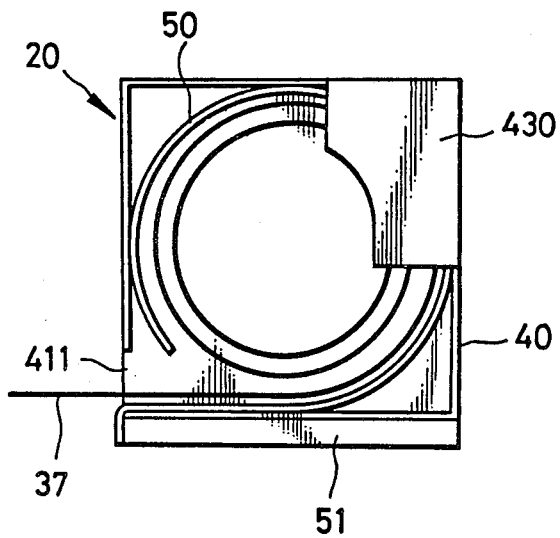
FIG. 5 is a front view of the film container of FIG. 3.

The film container 20 disposed on the right hand side of the film carrier 19 on the printing table 16, as is shown in FIGS. 3 and 5, comprises a box-shaped housing 40 whose width is a little greater than that of a negative film strip 37, a scrolled guide member 50 disposed in the housing 40, and a weight 51 attached to the bottom of the housing 40 for preventing the film container 20 from being moved and/or knocked over upon inserting the negative film strip 37 thereinto. The box-shaped housing 40 is formed with an entrance 411 for the negative film strip 37 at the lower end of a side wall 410 thereof on the left hand side, as seen in FIG. 3, and is provided with a front opening formed by cutting and removing parts of the left hand side wall 410 and an upper wall 420, and the greater part of a front wall 430, for removing a film with ease. The remaining part of the front wall 430 serves as a member for restraining and preventing the negative film strip 37 from slipping sideways. This remaining part of the front wall 430 is bent outward at its lower end 431 to prevent the leading end of the negative film strip 37 from being obstructed by the edge thereof if the negative film strip 37 is introduced with an outward inclination.

The scrolled guide member 50 which is fixedly attached to the inside of the housing 40 guides the negative film strip 37, causing it to be coiled in the film container 20 upon being pushed lengthwise into the film container 20. As is seen in FIG. 3, the guide member 50 has a width less than that of the negative film strip 37 so as to allow easy access to the rolled negative film strip 37 to pull it out. The forward end of the guide member 50 is bent downward at the entrance 411 so as to facilitate introduction of the negative film strip 37 into the film container 20. In order to prevent the negative film strip 37 inserted into the film container 20 from becoming scratched, it is desirable to make the guide member 50 of plastic material or metal sheet laminated with a plastic sheet such as a thin Teflon sheet. Although the weight 51 is made of iron in this embodiment, it may be a permanent magnet if the printing table 16 is a ferromagnetic metal.

Referring again to FIG. 2, the negative film strip 37 from which prints are to be made is placed between the lower and upper mask members 17 and 18 when printing. The upper mask member 18 is magnetic or is urged by a magnet (not shown) to press the negative film strip 37 against the lower mask member 17 so as to hold it flat during printing. The upper mask member 18 is released to allow the manual advancement of the negative film strip 37 by the operator after every print, in order to place a new frame of the negative film strip 37 between the lower and upper mask members 17 and 18 for the next print.

The negative film strip 37 thus advanced is directed toward the film container 20 and is introduced at first by hand into the entrance 411. As the manual advancement of the negative film strip 37 is repeated, the film 47 is directed into the film container 20 and is coiled with the aid of and along the inner surface of the guide member 50 as is shown in FIG. 5. A roll film contained in a patrone or cartridge is usually permanently rounded or curled with the emulsion-coated surface of the film inside. For this reason, the negative film strip 37 is easily coiled with the aid of the guide member 50. When the film container 20 is filled with a roll of or a plurality of rolls of films, it is replaced with another empty film container 20. It should be noted that, if the film container 20 is capable of containing a plurality of rolls of film, the leading end of each film should be introduced beneath the tail of the previous one stored in the container 20.

If it is required to remove the coiled film 37 from the film container 20, protruding parts of the turns of the negative film strip 37 are plucked out with the fingers from the opening formed in the front wall 430 of the housing 40.

Figure 6:
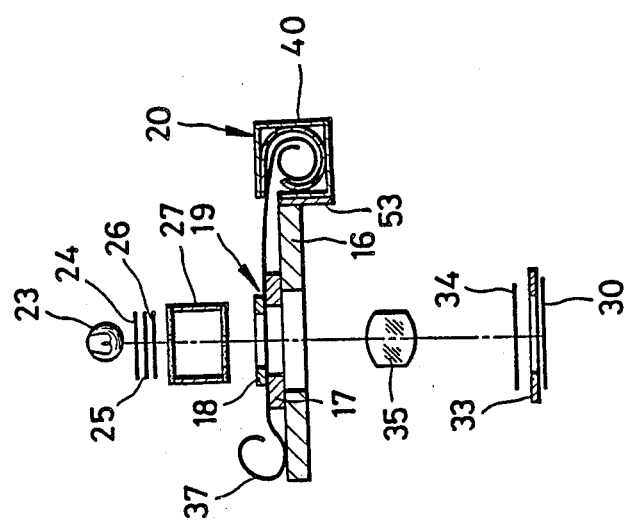
FIG. 6 is a schematic illustration showing a principal part of a top-illuminated type of printer embodying the present invention.

FIG. 6 illustrates the optical arrangement of a printer of the type in which a lamp housing is located above the negative, and the printing light is directed downward. In this printer, because the negative film strip 37 is placed with the emulsion-coated surface facing downward on the film carrier 19, the film container 20 is disposed upside down. For this reason, the housing 40 is provided with a permanent magnet plate 53 attached to the side wall 410 thereof and thus is magnetically attracted to the metal table 16 on one side thereof. If the weight 51 is relied on for stabilizing the film container 20, instead of a magnet plate 43, then an L-shaped bracket is provided on the side of table 16 for supporting the film container 20 thereon.

Figure 7:
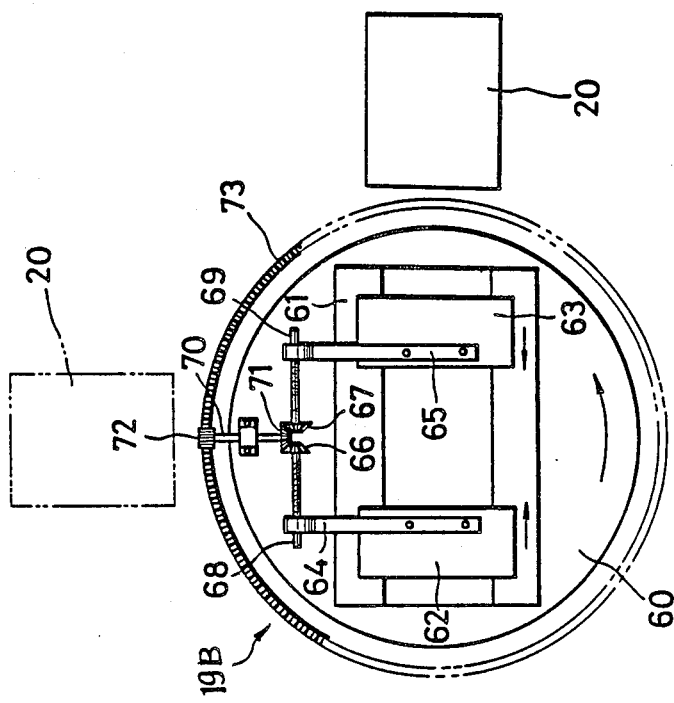
FIG. 7 is a schematic illustration showing a film carrier changeable in position and masking size.

FIG. 7 shown a film carrier 19B which can be changeable in masking size in order to enable producing prints from half and full negative frame sizes. A turntable 60 is disposed at the center of a printing table (not shown). On this turntable 60 is a lower mask member 61 on which first and second upper mask members 62 and 63 are supported for rectilinear movement so as to move toward and away from each other in the directions shown by arrows, thereby varying the size of the aperture of the negative carrier. For causing the rectilinear movement of the first and second upper mask members 62 and 63, each member 62, 63 is provided with an arm 64, 65 extending laterally therefrom which rotatably supports a screw rod 68, 69. These screw rods 68 and 69 have threads in the same direction and are provided with bevel gears 66 and 67 respectively, in mesh with a common bevel gear 71 at one end of a shaft 70. In this way, the screw rods 68 and 69 rotate in opposite directions to each other when the shaft 70 rotates in either direction. At the other end of the shaft 70 is a pinion gear 72 in mesh with a circular rack 73 fixed to the printing table. Therefore, when turning the turntable 60, the first and second upper mask members 62 and 63 move towards or away from each other.

When making prints using the full negative size of the frames of a film, the tuntable 60 is turned to the position shown in FIG. 7, and the film container 20 is disposed at the position shown in FIG. 7. A negative film strip from which prints are to be made is placed between the lower and upper mask members 61, and 62 and 63, and advanced from left to right one frame each print. As a consequence, the negative film strip emerges from the film carrier 19B and enters the film container 20. In the same manner as described for the first embodiment, the negative film strip thus entering the film container 20 is coiled therein.

On the other hand, when making prints using the half negative size of the frames, the turntable 60 is turned 90° from the position shown in FIG. 7 to move the upper mask members 62 and 63 toward each other, thereby reducing the size of the aperture defined by the lower and upper mask members 61, and 62 and 63. This closing movement results from the relative movement between the gear 72 and circular rack 73 in mesh with each other which causes the rotation of the screw rods 68 and 69 in opposite directions. As a result, the film carrier 19B has an aperture reduced to half the full negative frame size. At this time, the film container 20 is disposed at the position shown by a double dotted line in FIG. 7 wherein it is in alignment with the direction in which the negative film strip is advanced from the front to the rear of the printing table.

Instead of moving the film container 20 from the position shown in full line to the position shown by a double dotted line in FIG. 7, another film container may be disposed at the position shown by the double dotted line. It is also permissible to fix the film container 20 on the turntable 60 in order to avoid moving the film container. This can be accommodated by enlarging the turntable 60 in diameter.

Figure 8:
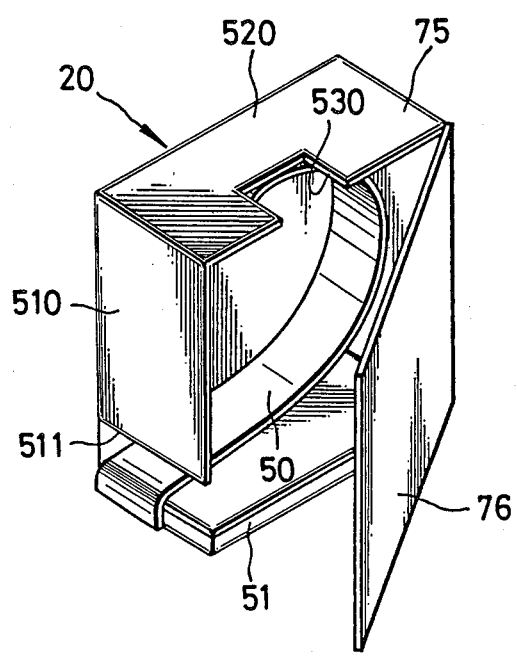
FIG. 8 is a perspective view of another embodiment of the film container.

FIG. 8 shows another example of the film container, which this time has a front door 76 pivotally mounted on a box-like housing 75 for opening and closing movement. This front door 76 is preferably transparent so as to make it possible to see films in the film container 20 therethrough and has a locking mechanism so as to prevent accidental opening thereof. In the top wall 520 of the housing 75 there is formed an opening 530 for allowing easy access to the coiled film strip in the film container 20 when plucking the coiled film from the film container 20. Numeral 511 denotes a film entrance and numeral 50 is the same guide member as shown in the previous example.

Figure 9:
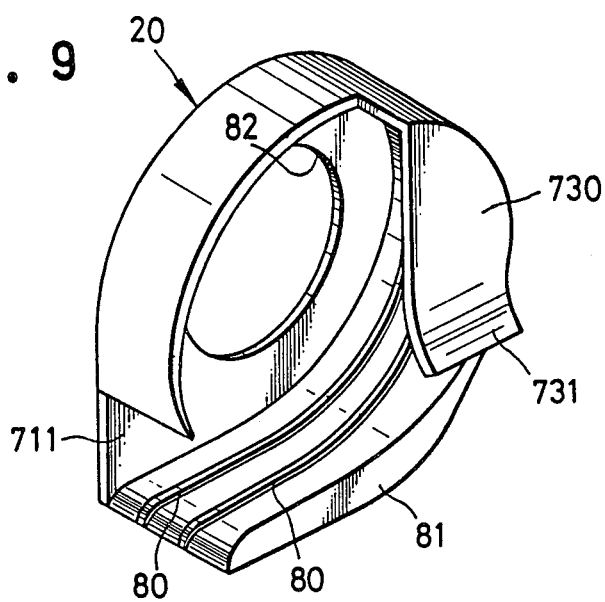
FIG. 9 is a perspective view of still another embodiment of the film container.
Figure 10:
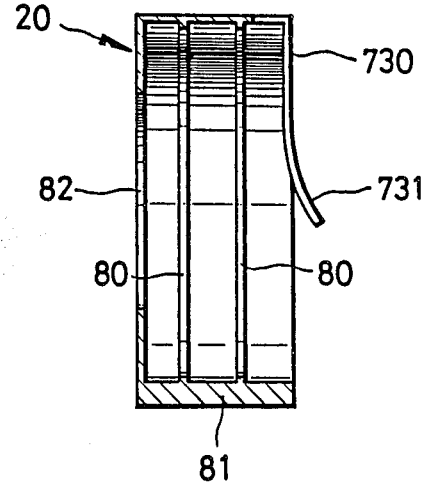
FIG. 10 is a sectional view of the film container of FIG. 9.

FIGS. 9 and 10 show a further example of the film container 20 which is generally cylindrically shaped. This film container 20 is preferably made of plastic. The bottom 81 of the film container 20 is made flat so as to rest stably on the printing table 16 shown in FIG. 1. The greater part of the front and the upper left of the film container 20 is open. On the inner wall of the film container 20, there are two ribs 80 in order to guide the film strip. These are faired downwardly at entrance 711 so as to guide the introduction of the negative film strip smoothly. A front wall 730 partly occupying the front opening of the film container 20 has its lower end 731 bent outward so as to prevent the leading end of the negative film strip from being obstructed by the edge thereof if the film is introduced with an outward inclination. In the rear wall of the film container 20, there is a circular opening 82 through which coiled film strips in the film container 20 are pushed out when they are removed. This opening is helpful in order to prevent the coiled film strips from becoming loose when being removed.

As is described above, the photographic printer according to the present invention, which is provided with the film container disposed on one side of the film carrier toward which a negative film strip emerges from the film carrier after exposure, can collect the negative film strip in the film container in good shape, preventing negative film strips from hanging down from the table and thereby becoming scratched. Due to the permanent curl of the film strips, the negative film strips can be coiled smoothly in the film container merely by advancing the negative film strips rectilinearly in the same way as in conventional photographic printers. The photographic printer is effective, in particular, when the negative film strip is advanced toward the printer housing, because the negative film strip is prevented from being obstructed by the printer housing.

Although the present invention has been fully described by way of the preferred embodiments thereof with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A photographic printer having a printing table which comprises:
    a film carrier disposed on said printing table for holding a film strip from which prints are to be made; and
    a film container disposed beside said film carrier on said printing table and in the path along which said film strip emerges from said film carrier after printing, said film container being adapted to collect said film strip in a coil;
    said printing table being a ferro-magnetic metal plate and said film container having a permanent magnet with which said film container is stably held on said printing table.

2. A film container for use with a photographic printer having a printing table that bears a film carrier for holding a film strip from which prints are made, said film container comprising:
    a housing having a film entrance through which said film strip emerging from a said film carrier is introduced; and
    a guide member provided in said housing for causing said introduced film strip to be coiled;
    said housing comprising a box having a permanently largely open front and a permanently partially open side wall.

3. A film container as defined in claim 2, wherein the remainder of said front wall comprises a retainer for releasably retaining said coiled film strip in said film container.

4. A film container as defined in claim 3, said remainder of said front wall having a lower end that is bent outward.

5. A film container for use with a photographic printer having a printing table that bears a film carrier for holding a film strip from which prints are made, said film container comprising:
    a housing having a film entrance through which said film strip emerging from a said film carrier is introduced; and
    a guide member provided in said housing for causing said introduced film strip to be coiled;
    said housing having a front door mounted thereon for opening and closing horizontal swinging movement toward and away from said film entrance.

6. A film container for use with a photographic printer having a printing table that bears a film carrier for holding a film strip from which prints are made, said film container comprising:
    a housing having a film entrance through which said film strip emerging from a said film carrier is introduced;
    said housing having front and rear walls and a cylindrical inner wall extending between said front and rear walls, said cylindrical inner wall having a plurality of inwardly extending arcuate ribs formed thereon, said ribs being spaced a substantial distance from said front and rear walls and being disposed in the path of said film strip a sufficient distance about said cylindrical wall to cause the film strip to be coiled.

* * * * *